United States Patent [19]

Burge et al.

[11] 4,096,285

[45] Jun. 20, 1978

[54] SWEETENING COMPOSITIONS CONTAINING ALDOHEXURONIC ACIDS

[75] Inventors: Malcolm Leonard Ernest Burge, Thatcham; Zdenek Nechutny, Reading, both of England

[73] Assignee: Tate & Lyle Limited, London, England

[21] Appl. No.: 702,200

[22] Filed: Jul. 2, 1976

[30] Foreign Application Priority Data

Jul. 4, 1975 United Kingdom ............... 28233/75
Jul. 4, 1975 United Kingdom ............... 28229/75

[51] Int. Cl.$^2$ ............................................. A23L 1/236
[52] U.S. Cl. .................................... 426/548; 426/656; 426/658; 426/804
[58] Field of Search ............... 426/548, 656, 658, 804

[56] References Cited

U.S. PATENT DOCUMENTS

| 3,667,969 | 6/1972 | Kracauer | 426/548 |
| 3,780,190 | 12/1973 | Kracauer | 426/548 |
| 3,878,184 | 4/1975 | Dobry | 426/548 X |
| 3,886,295 | 5/1975 | Burke et al. | 426/804 X |

Primary Examiner—Raymond N. Jones
Assistant Examiner—Esther M. Kepplinger
Attorney, Agent, or Firm—Ostrolenk, Faber, Gerb & Soffen

[57] ABSTRACT

A sweetening composition containing at least one sweetener selected from a protein sweetener, and saccharin, together with a sweetness modifier comprising an aldohexuronic acid or a salt, amide or lactone thereof possesses enhanced sweetening properties as compared with a composition containing no sweetness modifier; the sweetness profile is more rounded and unpleasant aftertastes are minimized.

25 Claims, No Drawings

SWEETENING COMPOSITIONS CONTAINING ALDOHEXURONIC ACIDS

The present invention relates to compositions which are useful as sweeteners for edible materials.

Although sucrose is still the most widely used sweetening agent, synthetic sweeteners have become increasingly important in recent years.

Saccharin is an example of a commonly used synthetic sweetener. The term saccharin as used herein is defined to mean saccharin itself and its salts and includes, for example, sodium saccharin, calcium saccharin, potassium saccharin, ammonium saccharin and magnesium saccharin. Saccharin is widely used as a substitute for sugar, but has the disadvantage of having a bitter and metallic after-taste to which, it has been reported, for one quarter to one third of the population is sensitive.

In the past, many additives have been proposed for saccharin compositions in order to eliminate or reduce the after-taste but none has proved really successful or popular. Examples of proposed additives include glucono-delta-lactone, calcium gluconate, lactose, ribonucleotides, piperazine, pectin, mannitol, maltol, adipic acid and sodium chloride.

The need thus remains for a modified saccharin composition in which the unpleasant after-taste has been substantially reduced or, ideally, eliminated completely.

Cyclamates e.g. cyclamic acid or its salts such as sodium cyclamate have also been proposed for use in sweetening compositions both as an alternative to saccharin and in admixture with saccharin. However they, too, suffer from an unpleasant after-taste.

Naturally occurring protein sweeteners are now of considerable interest. For example, a sweet principle (known as thaumatin) occurs in the fruit of the tropical plant *Thaumatococcus daniellii* Benth. of the family Marantaceae which grows in various parts of tropical Africa. The plant is called Katemfe in Sierra Leone. The fruit is tetrahedral, approximately 4 cm diameter and contains up to three large black seeds each having a white or light yellow aril at its apex and surrounded by a transparent jelly. The arils are intensely sweet. Thaumatin can be extracted by the procedures described by van der Wel and Loeve, Eur. J Biochem., 31 221-5, (1972). A particularly advantageous procedure using an aluminium salt solution as extractant is described in our copending cognate British Application No. 17831/75 and 5719/75.

Another sweet principle (known as monellin) is found in the fruit of the tropical plant *Dioscoreophyllum cumminsii* Diels. of the family Menispermaceae. The plant and berries have become known as Guinea Potato or Serendipity Berry. The plant is native to the forests of tropical West Africa and bears grape-like clusters of red berries about half inch in diameter. The berries have a tough outer skin enclosing a white sweet-tasting mucilaginous material surrounding the seed. The sweet principle can be extracted from the mucilaginous material using the procedure described, for example, in the papers of J. A. Morris et al. J. Biol. Chem. 248 (2), 534–9 (1973) or by van der Wel, F.E.B.S. Letters 21 (1), 88–90 (1973).

Thaumatin and monellin are many times sweeter than sucrose but have the disadvantage of a delay in perception of the sweet taste, a persistent lingering sweet taste and a slight after-taste often described as liquorice-like.

We have now found surprisingly that certain sugar acids having themselves no sweet taste, when incorporated in compositions containing a protein sweetener such as thaumatin or monellin, or saccharin or a cyclamate, or mixtures thereof, enhance the overall sweetness of the composition and reduce or eliminate the after-taste which is often considered unpleasant.

According to the present invention, we provide a sweetener composition containing at least one sweetener selected from a protein sweetener, and saccharin, together with a sweetness modifier comprising an aldohexuronic acid or a salt, amide or lactone thereof.

The aldohexuronic acids may be represented by the general formula:

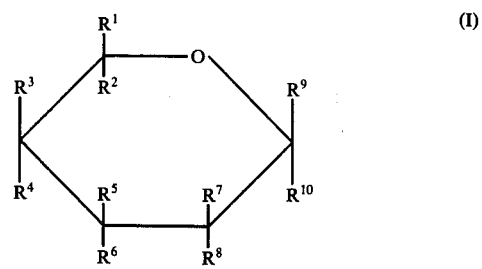

in which one of $R^1$ and $R^2$ represents a carboxyl group and the other a hydrogen atom, and each pair $R^3/R^4$, $R^5/R^6$, $R^7/R^8$ and $R^9/R^{10}$ represents a hydrogen atom and a hydroxyl group.

Salts of compounds of the formula (I) include, particularly, alkali metal salts and alkaline earth metal salts, in particular the sodium salts.

As stated above, other derivatives of the acids of formula (I) include amides thereof, and lactones, in particular those of the formula:

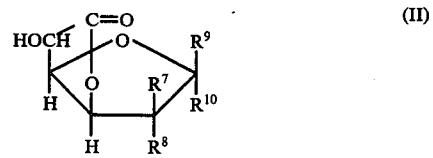

in which $R^7$, $R^8$, $R^9$ and $R^{10}$ are as defined for formula (I). In fact, aqueous solutions of free acids such as mannuronic acid do spontaneously lactonise.

In particular, the compositions may contain an aldohexuronic acid or derivative in the D-series. Particularly noteworthy compounds include D-glucuronic acid, D-glucuronolactone, sodium D-glucuronate, glucuronamide, D-galacturonic acid, D-mannuronic acid, and mannuronolactone.

Also of interest is L-guluronic acid.

The compounds of formula (I) and derivatives thereof have physical and organoleptic properties which make them suitable for inclusion in sweetening compositions. They have no noticeable sweetness and thus do not, in themselves add sweetness to the composition. Their inclusion in a sweetening composition does, of course, slightly increase the calorific value per unit sweetness of the composition, but since the composition is many times as sweet as sucrose, much smaller amounts are needed to produced the same sweetening effect as a given amount of sugar and so the calorie intake of the consumer is virtually negligible. Compositions according to the invention are thus suitable for incorporation into dietetic and diabetic foods.

The ratio by weight of modifier to protein sweetener may conveniently be stated with reference to the relative sweetness of the protein sweetener as compared with sucrose. Different protein sweeteners have different degrees of sweetness, and different extracts of the same protein sweetener may also have different degrees of sweetness.

When the sweetener used is a protein sweetener in the absence of saccharin, the ratio of D-series modifier to protein sweetener is desirably from $X$:350 to $X$:1750, preferably $X$:580, where $x$ is the number of times sweeter the protein sweetener is as compared with sucrose at a concentration of 5% by weight as described below; while the ratio of L-series modifier to protein sweetener is desirably from $X$:12 to $X$:72, preferably about $X$:32, where $x$ is as defined above.

Thus, the ratio by weight of modifier to thaumatin preferably lies within the range from 10:1 to 2:1, advantageously about 6:1 for uronic acids in the D-series and from 290:1 to 50:1, advantageously about 110:1 for L-guluronic acid, using thaumatin with a sweetness approximately 3,500 times that of 5% sucrose. The ratio by weight of modifier to monellin (of sweetness approximately 800 times that of 5% sucrose) preferably lies within the range 2.3:1 to 0.5:1, advantageously about 1.4:1 for uronic acids in the D-series and from 67:1 to 11:1, advantageously about 25:1 for L-guluronic acid.

When the sweetener used is saccharin alone, the preferred weight ratio of taste modifier to saccharin ranges from 1:10 to 1:1. A ratio above 1:1 is undesirable since at these levels the taste modifier significantly reduces the sweetness, even though the after-taste is still reduced. At ratios below 1:10, the reduction of the after-taste is less than generally required. A particularly advantageous range is from 1:5 to 1:3.

A protein sweetener, especially thaumatin, may be used as a sweetener in its own right in many food or pharmaceutical compositions where a novel sweet sensation and a lingering sweetness is desirable.

For many potential uses, it is however desirable to provide a sweet sensation as similar as possible to that of sucrose.

The delay in sweetness perception of the protein sweetener is related to the high molecular weight (approximately 20,000 for thaumatin and approximately 10,00 for monellin) so if an immediate sweetness impact is required the sweetener must be used in combination with an alternative sweetener such as sugar and/or an artificial sweetener such as saccharin or a cyclamate.

It is well known that the practical sweetening power of some alternative sweeteness varies when used in combinations with sugar or other sweeteners in different proportions. The sweetness of saccharin, for example, varies in different sugar/saccharin combinations. Similarly, the practical sweetening power of thaumatin varies with the ratio of thaumatin to sugar or saccharin (or alternative sweetener). The most effective combinations have approximately half the sweetness contribution from thaumatin (or monellin) and half from sugar or saccharin or a cyclamate.

Sweetener combinations containing thaumatin or monellin in conjunction with saccharin are particularly advantageous as the bitter after-taste of saccharin is minimised by the developing sweetness of the protein.

The effect of the modifier in such sweetener combinations is to minimise the sweetness duration and the after-taste, to give a more "rounded" sweetness profile to combinations of thaumatin with alternative sweeteners, and to enhance the overall sweetness of the sweetener combination alone.

In compositions in which the protein sweetener and saccharin each contribute about half the total sweetness, the modifier is preferably used at a level intermediate the levels used when either sweetener is used alone.

The use of thaumatin and monellin in combination with saccharin itself is described in our copending cognate application No. 702,199 of even date herewith.

Alternatively, we have found that it is a particular advantage of the aldohexuronic acids and their derivatives that their presence in the composition can enable saccharin to be partly or completely replaced by a natural sweetener such as sugar. Thus they make possible a completely saccharin-free sweetening composition of acceptable organoleptic properties.

We have also found that compositions containing two different aldohexuronic acids or derivatives thereof can exhibit a synergistic effect enabling smaller amounts to be used. A particularly noteworthy combination is that of D-glucuronic acid and D-galacturonic acid in equal parts by weight.

According to a further feature of the present invention, we provide a composition as defined above containing one of the sweeteners mentioned together with an aldohexuronic acid or derivative thereof, and also containing a sweetener selected from D(+)-arabitol, xylitol, L-gulose, D-fucose, lactulose, glucoheptose, D-galactose and D(+)-galactosamine.

The combination of a uronic acid with one of these sweeteners exhibits a synergistic effect similar to that of a combination of two different uronic acids.

The combination of a protein sweetener with a sweetener as listed is described and claimed in our said copending Application No. 702,199.

The compositions according to the present invention are completely soluble in water and may be used in hot or cold foods and beverages to give a sweetness equivalent to that of sugar.

The sugar-like quality of compositions containing saccharin may be enhanced by adding other components to the saccharin composition, in particular sodium chloride, e.g. in a weight ratio to saccharin of from 1:10 to 4:10, and/or an alkali metal or alkaline earth metal hydroxide, especially calcium hydroxide, e.g. in a weight ratio to saccharin of from 1:100 to 5:100.

The compositions of the invention are soluble in water and can be used to sweeten edible materials in general, including all kinds of foodstuffs, beverages and pharmaceutical preparations. They may be incorporated into, for example, soft drinks, candies, juices, syrups, squashes, sauces, condiments, salad dressings, frozen desserts such as ice creams and sherbets, icings, gelatin, toothpaste, mouthwashes or chewing gum. For ease of addition and in order to achieve homogeneous distribution at the desired dilution in edible material, the compositions of the invention may be formulated in the conventional manner with solid or liquid non-toxic carriers or diluents. For example, solid compositions may take the form of tablets or powders using edible solid carriers such as malto-dextrins, starch or nutritive proteins (e.g. soy protein); of the composition of the invention may be fixed with sucrose to provide a "fortified" sugar. Liquid compositions may take the form of aqueous solutions or of suspensions in other non-toxic liquids such as aqueous ethanol, glycerol and edible oils, and may be used, for example, for spraying.

For use in domestic applications, particularly as a replacement for sugar in beverage sweetening, it is desirable that the compositions according to the present invention include a bulking agent so that an equivalent sweetness to that provided by, say, a teaspoonful of sugar is provided by an amount which can conveniently be handled. Any suitable soluble and edible material can be used, for example, a carbohydrate such as sucrose itself, especially transformed sugar of low density, dextrose or sorbitol or a dextrin such as spray-dried maltodextrin. While the substances will add significantly to the calorific value of the composition, the total will still be considerably smaller than that of the amount of sugar providing an equivalent sweetness. Alternatively, the sweetening composition may be prepared in a tablet form.

The aldohexuronic acids and their derivatives possess no noticeable sweetness themselves and hence do not add sweetness to the composition. The sugars useful as taste modifiers do possess some sweetness in their own right. However, the comparative sweetness of the protein sweetener and/or saccharin in the composition is very much higher and thus, at the levels proposed, the sugar taste modifiers do not significantly contribute to the sweetness of the product.

The sweetening properties of protein sweeteners such as thaumatin and monellin are liable to be affected by heat. Some preparations of thaumatin and monellin suffer from loss of sweetness on heating to temperatures above 70° C for prolonged periods. When a composition of the invention is incorporated into a food or beverage whose preparation involves heating, it is desirable to add it after heating is complete so as to avoid loss of sweetness.

Compositions of the invention are usually stable at pH values in the range of from 2 to 10, especially 3 to 8. Dry compositions, such as powders, granules or tablets are stable indefinitely when stored under dry conditions at room temperature. Compositions in the form of aqueous solutions containing a protein sweetener are stable indefinitely when frozen. If a preservative such as benzoic acid or its salts, sulphur dioxide or sodium metabisulphite is added to such a composition, it may be stored almost indefinitely at room temperature. The composition therefore has a long shelf life when incorporated into soft drinks or fruit juices, or other similar food compositions containing preservatives.

Thaumatin, monellin, saccharin and cyclamates are much sweeter than sugar, have practically no calorific value compared with the equivalent sweetness of sugar and are, in general, cheaper to produce than sugar, so that the compositions of the invention need not be expensive. The compositions have a better sweetness and taste than the individual sweeteners alone, do not impair the flavour of edible materials in which they are incorporated and, when protein sweeteners are incorporated, can in some cases produce a slightly sustained sweetness sensation which is pleasant and is sometimes preferable to that of sucrose, where there is no such sustained sweetness.

The sweetness of some compositions according to the present invention was evaluated by a panel of experienced tasters against sucrose as a standard. The sweetness of the individual ingredients was also evaluated. Each material was dissolved in water at a neutral pH value to give a range of solutions each of a different concentration and the panel was asked to match the sweetness of the resulting solutions to that of a standard sugar solution.

The aldohexuronic acids and derivatives thereof were found to have no detectable sweetness. The acids themselves had a typically acid taste, while the sodium salts had a typically "salty" taste.

The panel was asked to compare the sweetness of a range of sodium saccharin solutions of different concentrations with that of 2% and 5% solutions of sucrose. They assessed the sweetness of sodium saccharin as 510 times that of sucrose when the 2% sucrose solution was used as standard and 410 times that of sucrose when the 5% sucrose solution was used as standard. This result is in accordance with the known decrease in the relative sweetness of saccharin and other sweeteners such as xylitol with increasing concentration (Schutz and Pilgrim, Food Research, March - April 1957, "Sweetness or various compounds and its measurement").

The thaumatin used also showed a decrease in relative sweetness with increasing concentration, although the decrease was not as pronounced as that of saccharin. When solutions of thaumatin were assessed against a 5% solution of sucrose, the panel assessed the sweetness of thaumatin as 3,500 times that of sucrose. When the solutions were assessed against a 15% solution of sucrose, the panel assessed the sweetness of thaumatin as 1,800 times that of sucrose.

When a composition containing saccharin and thaumatin is dissolved in water, the apparent sweetness of the solution is less than would be expected if the sweetness contributions of the saccharin and the thaumatin were additive. A sweetening composition was prepared by mixing together 1 part by weight of thaumatin and 10 parts by weight of sodium saccharin, and used to prepare a range of aqueous solutions each of different concentration. The panel assessed the sweetness of the composition as 550 times that of sucrose when the 5% solution of sucrose was used as standard. If the sweetness of the constituents had been directly additive a sweetness 691 times that of sucrose would have been expected when a 5% sucrose solution was used as standard. One possible reason for this apparent loss in sweetness is, as indicated above, that saccharin gives rise to an immediate sweetness of short duration, whereas thaumatin gives rise to a delayed and lingering sweetness. The maximum sweetness sensation of the two substances is perceived at different times so that the combined sweetness appears to be less than the sum of the sweetnesses of the individual substances.

The duration of the sweetness sensation is not usually significant when the relative sweetness of sucrose and artificial sweeteners, e.g. saccharin, or cyclamates are compared because the sensation of sweetness is usually of very short duration. However, we have found that duration is important in evaluating the sweetness of protein sweeteners such as thaumatin and monellin, where the lingering sweetness is significant. It is difficult to determine the precise relationship of the time of maximum perceived sweetness and the duration of the perceived sweetness.

In some sweetening compositions comprising saccharin together with thaumatin or monellin, a double peak of sweetness may be detected. We have found that the addition of an aldohexuronic acid or derivative thereof to form a composition according to the present invention, produces a single broad peak of sweetness. Furthermore, the sweetness of the composition is greater than that of the composition containing no aldohexuronic acid or derivative.

The following Examples illustrate particular compositions according to the invention and their evaluation.

EXAMPLES 1 to 10

Sweetening compositions suitable for incorporation into low-caloric foods and drinks were prepared by mixing together thaumatin and an aldohexuronic acid or derivative thereof with and without saccharin. Two series of compositions were prepared, referred to as series (a) and (b). In series (a) no saccharin was used, and in series (b) saccharin is present.

The compositions are summarised in Table 1 below: all figures are parts by weight but may also be read as g/liter for aqueous solutions.

Table 1

|  | Ex. | (a) | (b) |
|---|---|---|---|
| Thaumatin[1] |  | 0.02 | 0.01 |
|  | 1-10 |  |  |
| Saccharin[2] |  | — | 0.10 |
| D-glucuronic acid | 1 | 0.1 | 0.09 |
| D-galacturonic acid | 2 | " | " |
| D-glucuronamide | 3 | " | " |
| D-glucuronolactone | 4 | 0.12 | 0.05 |
| D-mannuronic acid | 5 | 0.1 | 0.04 |
| D-mannuronolactone | 6 | 0.12 | 0.05 |
| sodium D-glucuronate | 7 | 0.13 | " |
| L-guluronic acid | 8 | 2.2 | 1.0 |
| D-glucuronic acid + D-galacturonic | 9 |  | 0.01 0.01 |
| D-galactose + D-glucuronic acid | 10 |  | 0.4 0.01 |
| D-galactose (reference) |  |  | 0.80 |

[1]The thaumatin preparation used was evaluated at a sweetness (measured in the absence of modifiers) of approximately 3,500 × sucrose compared with 5% sucrose. The amount of thaumatin used can be varied pro rata for weaker or stronger extracts.
[2]Sodium saccharin was used; the free acid or other salts may be substituted.

All of the Examples in series (a) and (b) gave solutions of approximately equal sweetness.

Examples 9 and 10 illustrate the synergism obtained by the use of mixtures of two sweetness modifiers.

Example 9, in particular, shows the particular advantage of two aldohexuronic acids, in this D-glucuronic acid and D-galacturonic acid. When combined in equal proportions a total of 0.02 parts by weight gave the same sweetness to the composition as 0.04 parts by weight of D-glucuronic acid by itself in series (b). Similar results were obtained when other aldohexuronic acids or derivatives thereof were substituted for D-glucuronic acid and D-galacturonic acid.

Similarly Example 10 shows that in series (b) the addition of 0.41 parts by weight of a mixture of D-glucuronic acid and D-galactose gave a sweetness equivalent to that obtained by adding 0.8 parts by weight of D-galactose or 0.04 parts by weight of D-glucuronic acid. The figure of 0.41 parts by weight is made up of 0.40 parts by weight of D-galactose (50% of the amount of D-galactose needed by itself) and 0.01 parts by weight of D-glucuronic acid (25% of the amount needed by itself) giving a total modifier component of 75% of the amount used singly. Similar results were obtained when D(+)-arabitol, xylitol, lactulose or D(+)-galactosamine was used in place of D-galactose and/or another D-aldohexuronic acid or derivative thereof was used in place of D-glucuronic acid. L-gulose and D-fucose could also be used instead of D-galactose, but at the same level as the D-aldohexuronic acid.

EXAMPLES 11 and 12

Compositions similar to those of Examples 1 to 7(b) were prepared except that the saccharin content was replaced by an equivalent amount of sucrose. The compositions are summarised in Table 2.

Table 2

| Example | 11 | 12 |
|---|---|---|
| Thaumatin[1] | 0.023 | 0.038 |
| Sucrose | 24 | 16 |
| Na glucuronate, glucuronic acid etc[2] | 0.08–0.10 | 0.15–0.20 |
| approximate % sweetness contributed by thaumatin | 63 | 75 |

[1]As for Table 1
[2]NB at high levels (e.g. Example 12) the salt may be preferable to the acid if a sharp taste is to be avoided.

These results may be taken to indicate that when thaumatin contributes more than 50% of the sweetness of the composition, saccharin may be wholly or partly replaced by sugar.

The compositions of Examples 1 to 12 may be used in soft drinks or other food compositions.

EXAMPLES 13 to 15

Compositions similar to those of Examples 1 to 10, but containing monellin in place of thaumatin were prepared as in the following Table 3.

Table 3

|  | Example | Parts by weight |
|---|---|---|
| Monellin |  | 0.04 |
| Saccharin |  | 0.10 |
| D-glucuronic acid | 13 | 0.08 |
| D-galacturonic acid | 14 | 0.08 |
| D-glucuronic acid |  | 0.02 |
|  | 15 |  |
| D-galacturonic acid |  | 0.02 |

All compositions had essentially the same taste response as those in the corresponding column (b) of Table 1.

EXAMPLES 16 and 17

Compositions similar to those of Examples 1 to 10 but containing Na cyclamate in place of saccharin were prepared as in the following Table 4.

Table 4

| Example | 16 | 17 |
|---|---|---|
| Thaumatin | 0.01 | 0.01 |
| Na Cyclamate | 1.4 | 1.4 |
| D-glucuronic acid | 0.04 | — |
| D-galacturonic acid | — | 0.04 |

EXAMPLE 18

A bulked saccharin sweetener possessing the same sweetness as an equivalent volume of sugar was prepared by mixing the following ingredients and spray-drying to a bulk density of 0.2 g/cc:

| malto-dextrin solution containing dry weight | 222.2 g |
|---|---|
| sodium saccharin | 5.1 g |
| D-glucuronic acid | 1.7 g |

The resulting composition had a sweetening power equivalent to approximately 2 kilograms of sugar.

A similar sweetener may be obtained by substituting D-galacturonic acid, D-glucuronamide, D-glucuronolactone, D-mannuronic acid, D-mannuronolactone or sodium D-glucuronate, for the taste modifier mentioned above.

EXAMPLE 19

A bulked sweetener similar to that of Example 18, but containing a corresponding amount of L-guluronic acid, possesses similar sweetening characteristics.

EXAMPLE 20

| Granular sweetener: | |
|---|---|
| sodium saccharin | 100 g |
| D-glucuronic acid | 30 g |
| sodium chloride | 26.7 g |
| calcium hydroxide | 2.3 g |
| sugar (sucrose) | 3,000 g |

The above ingredients were uniformly mixed and wet granulated using about 1 to 2% of a 50% aqueous alcohol. Drying and sifting yields a granular product having a sweetening power equivalent to approximately 14 times its weight of sugar. Similar sweeteners may be prepared by substituting any of the other tast modifiers according to the present invention in place of D-glucuronic acid.

EXAMPLE 21

The following ingredients were uniformly mixed:
sodium saccharin; 100 g
D-galacturonic acid; 33.3 g
sodium chloride; 26.7 g
calcium hydroxide; 2 g
The mixture obtained had a sweetening power equivalent to approximately 200 times its weight of sugar.

EXAMPLE 22

For a low calorie lemonade, a bottling syrup is made up with the following ingredients (g/liter except where otherwise stated)

| thaumatin | 0.07 |
|---|---|
| saccharin | 0.7 |
| glucuronic acid | 0.35 |
| benzoic acid | 800 ppm |
| acidity (% w/v calculated as citric acid based on the weight of syrup) | 1.1% |
| essecen of lemon | 4.6 |

A 170 ml portion of the above bottling syrup is diluted to a volume of 1 liter with carbonated water to form a soft drink which is then bottled.

We claim:

1. A sweetener composition containing at least one sweetener selected from the group consisting of the protein sweetener thaumatin, the protein sweetener monellin and saccharin, together with a modifier selected from the group consisting of aldohexuronic acids and salts, amides and lactones thereof in an amount sufficient to reduce the sweet aftertaste of the protein sweeteners or the bitter aftertaste of the saccharin.

2. A composition as claimed in claim 1 in which the protein sweetener is thaumatin.

3. A composition according to claim 1 in which the modifier is an aldohexuronic acid of the formula:

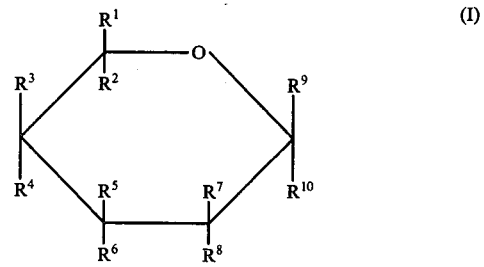

(I)

in which one of $R^1$ and $R^2$ represents a carboxyl group and the other a hydrogen atom, and each pair $R^3/R^4$, $R^5/R^6$, $R^7/R^8$ and $R^9/R^{10}$ represents a hydrogen atom and a hydroxyl group.

4. A composition as claimed in claim 3 in which the acid is present as an alkali metal or alkaline earth metal salt.

5. A composition as claimed in claim 4 in which the acid is present as the sodium salt.

6. A composition as claimed in claim 1 in which the modifier is an aldohexuronic acid lactone of the formula:

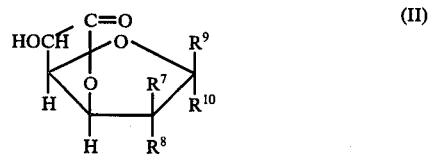

(II)

in which $R^7$, $R^8$, $R^9$ and $R^{10}$ are as defined in claim 3.

7. A composition as claimed in claim 1 in which the modifier is in the D-series.

8. A composition as claimed in claim 7 in which said modifier is selected from the group consisting of D-glucuronic acid, D-glucuronolactone, sodium D-glucuronate, glucuronamide, D-galacturonic acid, D-mannuronic acid and mannuronolactone.

9. A composition as claimed in claim 7 in which the protein sweetener is used in the absence of saccharin, and the ratio by weight of D-series modifier to protein sweetener is from about x:350 to about x:1750, where x is the number of times sweeter the protein sweetener is as compared with sucrose at a concentration of 5% by weight.

10. A composition as claimed in claim 9 in which the ratio is about x:580.

11. A composition as claimed in claim 1 in which the protein sweetener is used in the absence of saccharin, and the ratio by weight of an L-series modifier to protein sweetener is from about x:12 to about x:72, when in which x is as defined in claim 9

12. A composition as claimed in claim 11 in which the ratio is about x:32.

13. A composition as claimed in claim 1 in which saccharin is used in the absence of a protein sweetener, and the ratio by weight of modifier to saccharin is from about 1:10 to about 1:1.

14. A composition as claimed in claim 13 in which the ratio is from about 1:5 to about 1:3.

15. A composition as claimed in claim 1 containing thaumatin or monellin and further containing a sweetener selected from the group consisting of saccharin, cyclamates and sucrose.

16. A composition as claimed in claim 1 containing a combination of two aldohexuronic acid modifiers as defined in claim 1.

17. A composition as claimed in claim 16 containing substantially equal amounts of each modifier.

18. A composition as claimed in claim 16 containing D-glucuronic acid and D-galacturonic acid.

19. A composition as claimed in claim 1 also containing a sweetener selected from the group consisting of D(+)-arabitol, xylitol, L-gulose, D-fucose, lactulose, glucoheptose, D-galactose and D(+)-galactosamine.

20. A composition as claimed in claim 1 containing saccharin and further containing an additive selected from the group consisting of sodium chloride, an alkali metal hydroxide and an alkaline earth metal hydroxide.

21. A composition as claimed in claim 20 containing sodium chloride and saccharin in a weight ratio of from about 1:10 to about 4:10.

22. A composition as claimed in claim 20 containing calcium hydroxide and saccharin in a weight ratio of from about 1:100 to about 5:100.

23. A composition as claimed in claim 1 further containing a bulking agent.

24. A food product or beverage containing at least one sweetener selected from the group consisting of the protein sweetener thaumatin, the sweetener monellin and saccharin, together with a modifier selected from the group consisting of aldohexuronic acids and salts, amides and lactones thereof in an amount sufficient to reduce the sweet, aftertaste of the protein sweetener or the bitter aftertaste of the saccharin.

25. A food product or beverage according to claim 24 in which the protein sweetener is thaumatin.

* * * * *